United States Patent [19]

Fink et al.

[11] 4,344,601
[45] Aug. 17, 1982

[54] MOLD APPARATUS WITH ELASTIC CLAMPING MEANS

[75] Inventors: Lothar Fink, Achim-Baden; Lothar Wojcichowski, Achim, both of Fed. Rep. of Germany

[73] Assignee: Klöckner-Werke AG, Duisburg, Fed. Rep. of Germany

[21] Appl. No.: 244,401

[22] Filed: Mar. 16, 1981

[30] Foreign Application Priority Data

Mar. 22, 1980 [DE] Fed. Rep. of Germany ....... 3011200

[51] Int. Cl.³ .............................................. B29C 1/00
[52] U.S. Cl. ................ 249/167; 425/450.1; 425/451.9; 249/163
[58] Field of Search ............... 425/175, 179, 406, 407, 425/409, 411, 450.1, 451.9, DIG. 57; 249/160, 161, 162, 163, 164, 165, 167, 168

[56] References Cited

U.S. PATENT DOCUMENTS

| | | | |
|---|---|---|---|
| 2,564,026 | 8/1951 | Osborn | 249/163 X |
| 3,195,186 | 7/1965 | Gauban et al. | 425/450.1 X |
| 3,309,738 | 3/1967 | Friedman | 249/164 |
| 3,316,593 | 5/1967 | Neumann | 425/411 X |
| 3,825,396 | 7/1974 | Kontz | 425/451.9 X |
| 3,865,534 | 2/1975 | Mori | 425/451.9 X |

*Primary Examiner*—J. Howard Flint, Jr.
*Attorney, Agent, or Firm*—Sughrue, Mion, Zinn, Macpeak and Seas

[57] ABSTRACT

Mold clamping forces are provided by mounting the mold halves between spaced crossheads connected by elastically deformable rods of tensile steel. The crossheads are pulled slightly apart by hydraulic cylinders to expand and tension the rods, and the prepared molds are then inserted together with appropriately dimensioned wedges or shims to occupy the expansion space. When the hydraulic pressure is released the elastic restoration or spring forces of the stretched rods serve to clamp the assembled molds tightly together to enable injection, curing, etc. A plurality of such mold assemblies may be circumferentially spaced around a rotatable turntable, and the various opening and closing movements may be controlled by rollers on the mold components running in stationary cam tracks around the turntable. C-shaped mold clamps may also be used instead of the crosshead and rod configurations.

16 Claims, 9 Drawing Figures

MOLD APPARATUS WITH ELASTIC CLAMPING MEANS

BACKGROUND OF THE INVENTION

This invention concerns an apparatus for the production of molded articles made of plastic or rubber in at least one molding station having at least one mold consisting of upper and lower halves clamped together in the closed position by means of elastic elements.

In die casting, injection molding and vulcanization machines large hydraulic cylinders are usually assigned to each molding station to transfer comparatively high closing forces to the mold parts. In addition, the individual molding stations are often equipped with separate, long-stroke transport cylinders which execute the opening movements of the mold parts when the closing cylinder is relieved. Such devices are expensive to construct and maintain owing to the large number of pressure cylinders, particularly when the device has a great number of molding stations - for example on a turntable.

A known apparatus for a single molding station presses together the two halves of the mold with a preloaded spiral spring acting against the upper half of the mold in its closed position. This spring rests at one end on the upper side of the mold half and at the other end on the head of a threaded pin for adjusting the tension force. The opening of the mold is effected by a pressure cylinder against the closing force of the spring, i.e. by further compressing it (German Pat. No. 2,052,177). This device is still comparatively complex, and the structural design of the molding station results in an unbalanced distribution of the closing forces. Finally, it is a disadvantage that when the mold is open the spring is permanently subjected to an increased tension.

SUMMARY OF THE INVENTION

The apparatus according to this invention is characterized by the upper mold and lower mold halves being clamped against each other in the closed position by elastically deformable components embodied directly within the molding apparatus and forming integral parts of its construction, i.e. making such components of tensile steel.

The concept on which the invention is based consists of providing elastically deformable components which actually belong to the molding station, i.e. structural elements which originally and customarily exist in such molding stations, and utilizing the spring force of these components to produce the closing force on the molds. These components thus serve a dual function.

Customarily, the mold halves are placed between the upper and lower support elements of the molding station. According to the invention, the closing force is developed by making the support elements themselves elastically deformable, or by expanding the components connecting the support elements, such as tie rods.

Surprisingly, comparatively high closing forces can be produced with a relatively slight deformation of the elastic components. They may also be locked in the deformed (closing) position by chuck wedges or the like installed between the molds or between the support element and the mold.

The invention can be used to great advantage for injection molding or vulcanization systems in which a great number of molding stations are transported along an endless path, particularly by a turntable rotating in a cyclic manner. Different stationary operating stations, for example a tensioning station and a releasing station, can be assigned to the turntable to act on the respective molding stations in a tensioning or expanding sense. The molds can be released and opened in these stations by the expansion of the elastic components, or they can be closed by a reversed functional sequence. The wedges placed into position under force in a lateral direction play an important role in the locking of the molds.

The rotation of the turntable itself can also be utilized to automatically open the molds by roller and cam track means, or to remove a mold.

DETAILED DESCRIPTION OF THE PREFERRED EMBODIMENTS

Figure 1:
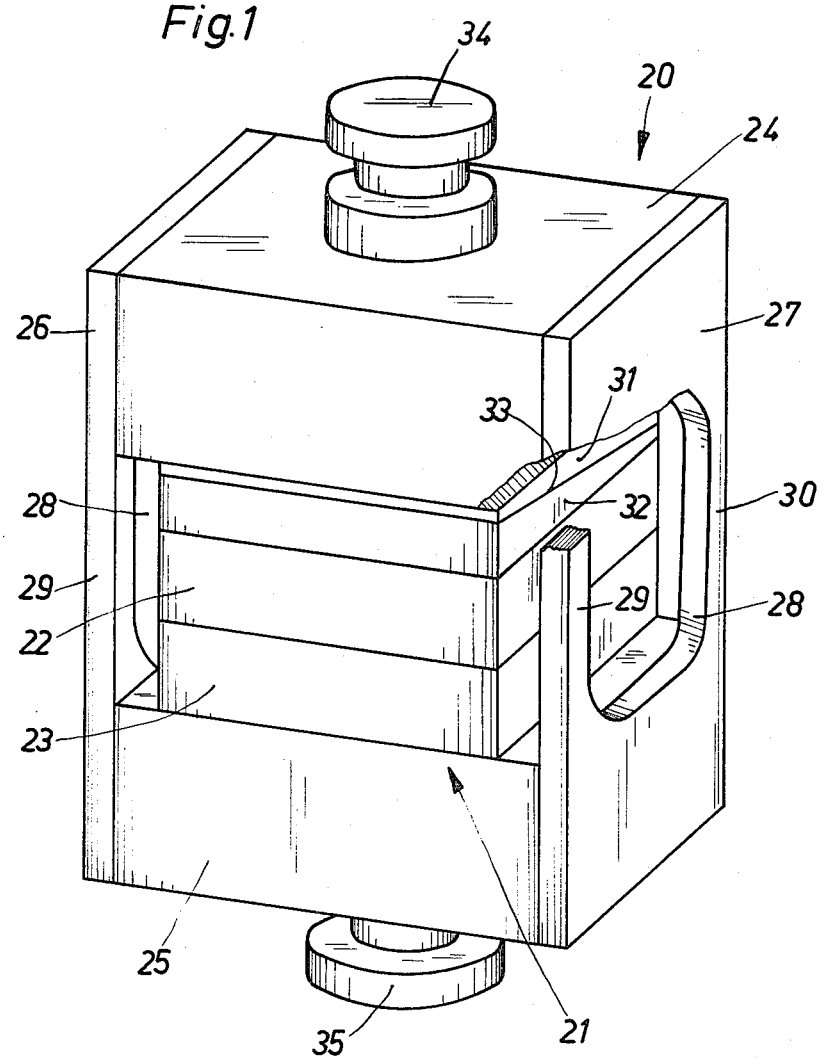
FIG. 1 shows a perspective view of a simple molding station according to the invention.

In the embodiment of FIG. 1 the molding station 20 is in the form of a box. A mold 21 consisting of an upper mold 22 and a lower mold 23 is placed between upper and lower crossbars 24, 25. The crossbars are connected with each other by side plates 26, 27 which exert the tensile clamping forces, and which have windows 28 which form side bars 29 and 30 in the corners.

The necessary high closing or holding force is exerted on the mold 21 by elastically expanding the side bars 29, 30 during the insertion of the mold and then releasing them. This produces a considerable tensile force in the side bars which urges the crossbars 24, 25 towards each other.

To facilitate the opening and closing of the mold 21 as well as its removal from the molding station 20, a special locking element is provided which consists of two interacting chuck wedges 31 and 32. In their tensioning position according to FIG. 1 they are placed against each other along their tapered surfaces 33. To open the mold when the side bars 29, 30 are expanded or stretched the wedges 31, 32 are pulled out laterally in opposite directions. Pressure cylinders can be used for this purpose, not shown.

To close the mold and produce the necessary clamping force, the wedges are inserted with the side bars elastically expanded. The wedges then maintain the clamping force when the side bars are released.

The elastic expansion of the side bars 29, 30 is implemented by a tensioning unit, not shown, which engages mushroom-like dogs 34, 35 on the upper and lower sides of the crossbars 24, 25 and acts upon them in opposite directions.

Figure 2:
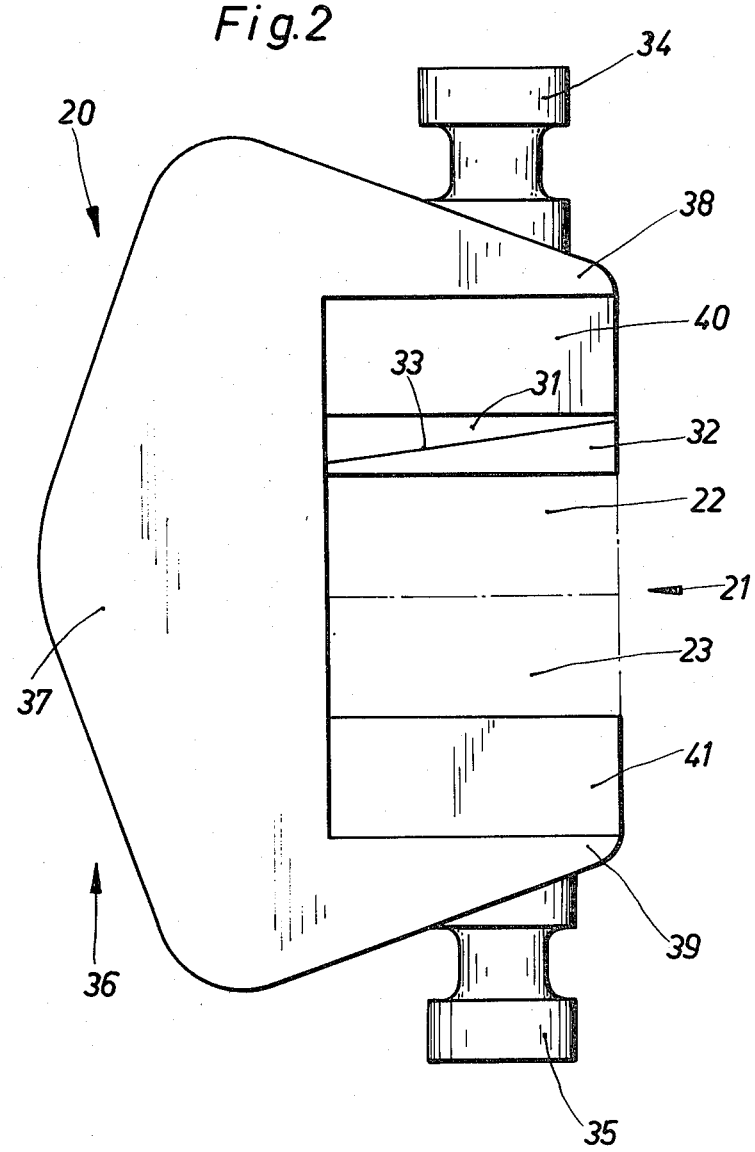
FIG. 2 shows a side view of an alternate molding station design.

A comparatively simple molding station 20 is also shown in FIG. 2, consisting of a C-shaped, elastically deformable clamp 36. The center support 37 of this clamp is the component which is expanded. Laterally projecting arms 38 and 39 are provided with carrying plates 40 and 41 at the top and bottom. The mold 21 is placed between them together with two wedges 31 and 32. The dogs 34 and 35 for the tensioning unit are mounted off-center on the arms 38, 39 relative to the mold axis. When the opening or deformation force is applied, the support 37 is expanded predominantly by bending to spread the arms.

Figure 3:
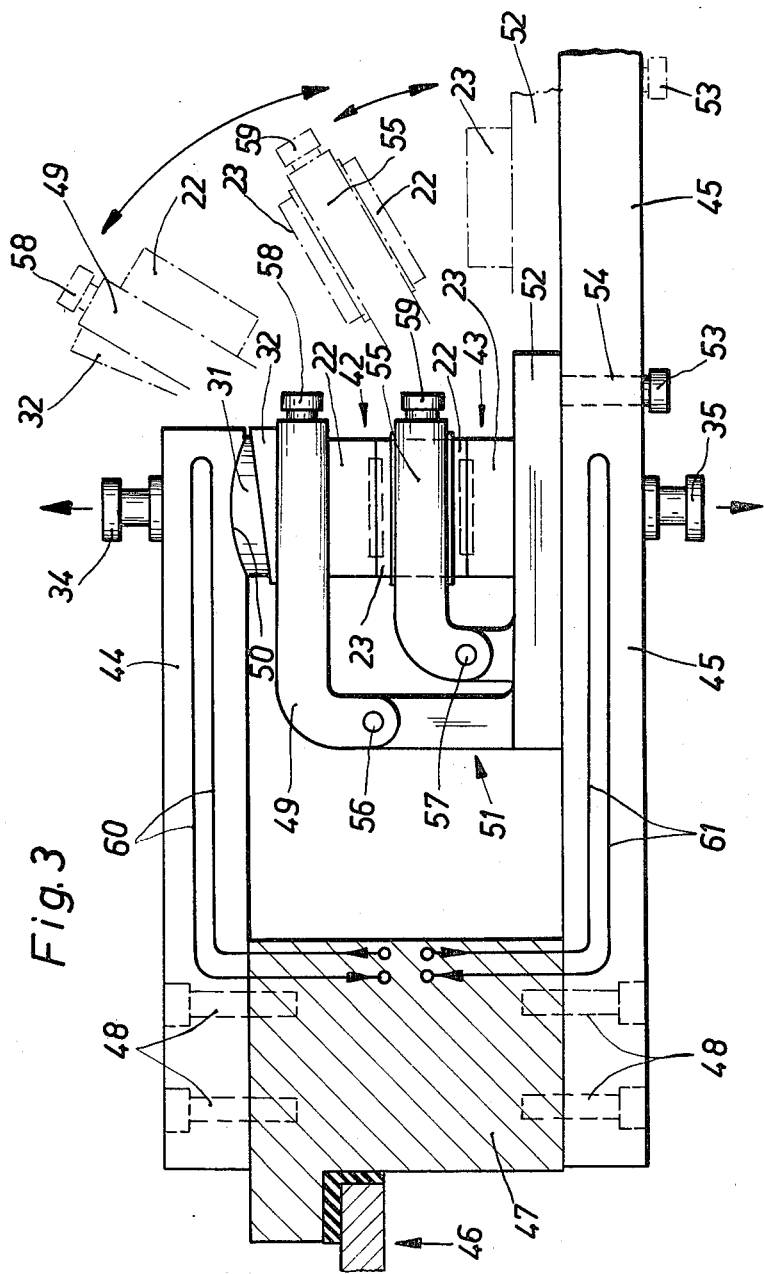
FIG. 3 shows a molding station on a turntable in lateral and radial cross-section.

A further design is shown in FIG. 3, wherein two stacked molds 42 and 43, each having an upper mold 22 and lower mold 23, are placed between an upper arm 44 and a lower arm 45 connected with each other at a distance from the molds. This embodiment represents a molding station 20 on a turntable 46. A number of molding stations as shown in FIG. 3 are spaced from each other around the circumference of the turntable. The connection between the arms 44, 45 is formed by a solid annular carrying ring 47 connected to the turntable. The arms are fastened to the upper and lower sides of the ring 47 by rigid bolts 48.

The necessary clamping or closing force is applied to the molds 42, 43 by the elastic bending of the arms 44, 45 via dogs 34 and 35 attached to the upper and lower sides of the arms.

Two wedges 31, 32 are again used as locking elements when the molds 42, 43 are closed. The wedge 32 is mounted on a pivot plate 49 carrying the upper mold 22. The counterpart wedge 31 is fastened to the upper arm 44 and has a spherical segment shaped, slideable bearing surface 50. Deviations from the parallel position of the arms 44, 45 are compensated for by this feature such that the molds 42, 43 are always subjected to an evenly distributed axial clamping force.

The molds are moved out of the molding station 20 for their opening and possible exchange or preparation by a radially displaceable unit 51. A lower base plate 52 is slideably disposed on the lower arm 45 and can be shifted in a longitudinal direction. For this purpose the arm 45 and base plate 52 are coupled by a guide slot and pin arrangement, not shown in detail in FIG. 3. The shifting from and into the molding station 20 is effected by a guide roller 53 extending downwardly through an elongated slot, not shown, in the arm 45 and mounted on a tenon 54 fixed to the base plate 52. Expediently, the turntable includes a stationary, curved cam track in which the guide roller 53 runs during the rotation of the turntable. Thus, the turntable rotation is transposed into a radial movement of the unit 51.

The lower mold 43 is placed directly on the base plate 52. An intermediate pivot plate 55 forms the base for the upper mold 42. The pivot plates 49 and 55 are connected to the base plate 52 by bearing pins 56, 57. The upper part 22 of the upper mold 42 is fastened to the pivot plate 49 while its lower part 23 and the upper part 22 of the mold 43 are attached to the opposite sides of the pivot plate 55. The lower part 23 of the mold 43 is placed on the base plate 52.

When the unit 51 is moved out of the molding station 20 into the position indicated in FIG. 3 by dotted lines, the molds 42 and 43 can be opened by swiveling the pivot plates 49 and 55 through different angles. The molds are opened in this way to remove the molded articles and to make preparations for the next operational cycle. The lower arm 45 is extended outwardly beyond the area of the molding station 20 and forms a support for the base plate 52 in the open position.

The opening and closing of the molds 42, 43 can be mechanized or automated by rollers 58 and 59 attached to the radially outer ends of the pivot plates 49 and 55 which run in stationary cam tracks to thus control the swiveling of the pivot plates during the rotation of the turntable 46. As also shown in FIG. 3, temperature control ducts 60, 61 can be provided in the arms 44, 45 to appropriately heat the molds 42, 43.

Figure 4:
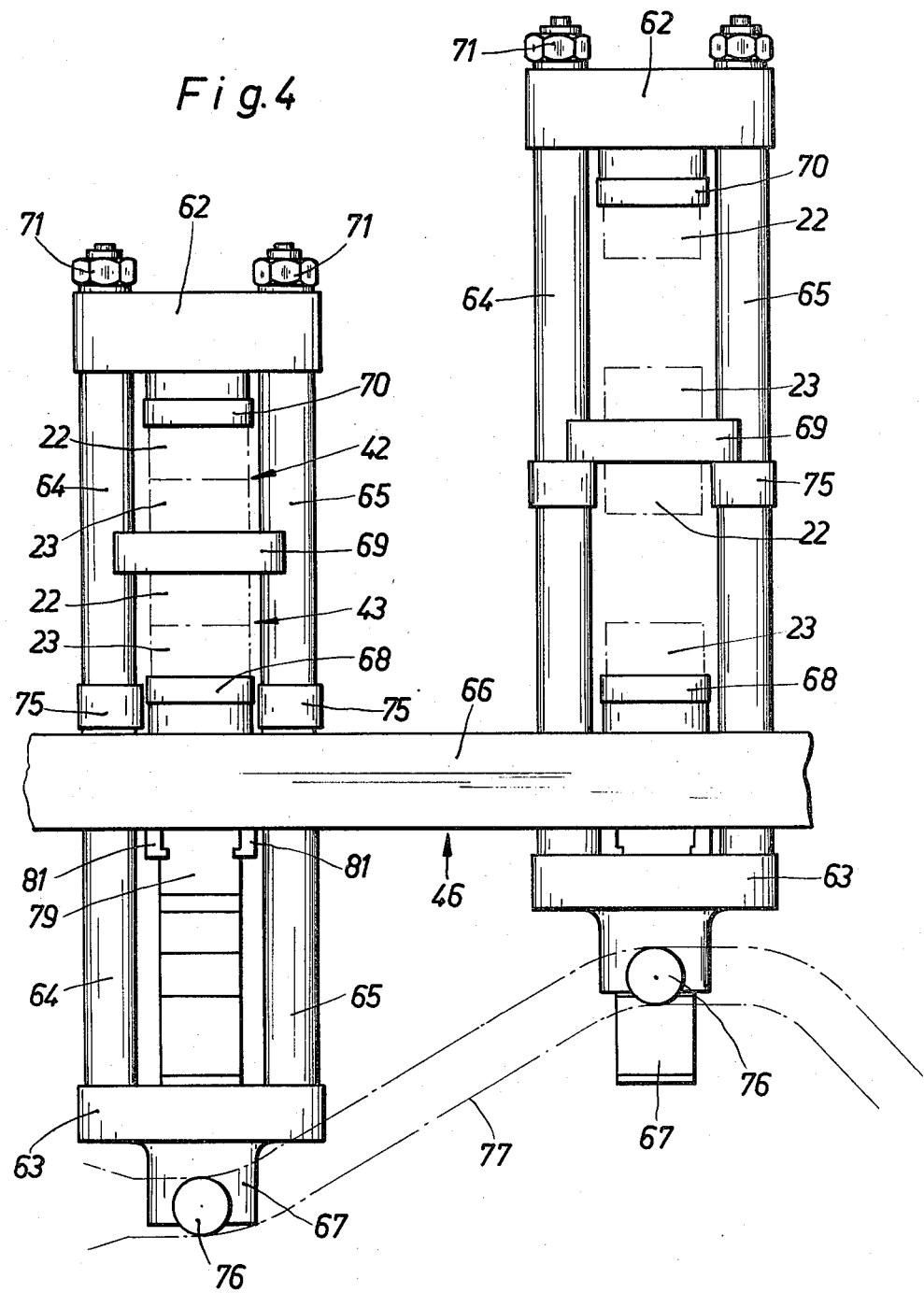
FIG. 4 shows an outside view of a turntable with two molding stations in different positions.
Figure 5:
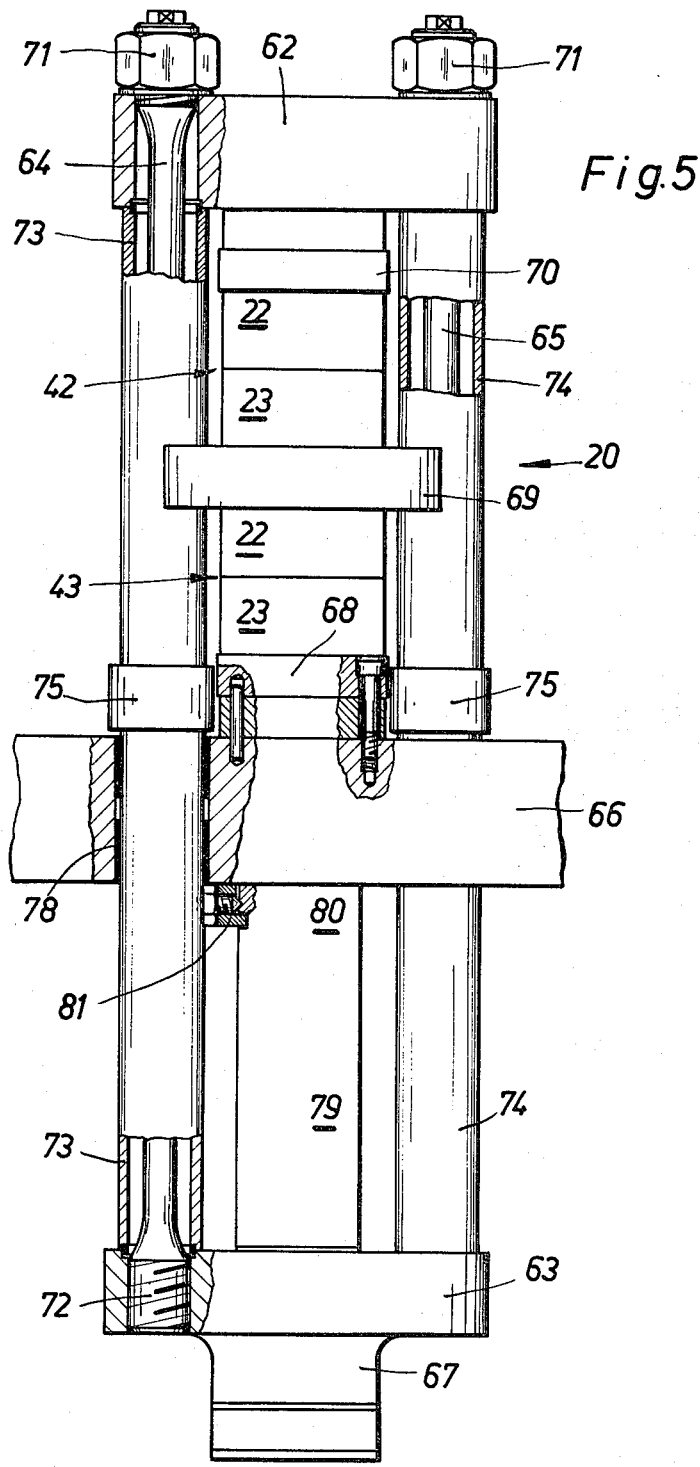
FIG. 5 shows a front view of a molding station according to FIG. 4 in greater detail.

The embodiment of FIG. 4 has an upper crossbar 62 and a lower crossbar 63 connected with each other by vertical tension rods 64, 65 (preferably three of them). The two molds 42, 43 are placed between the upper crossbar 62 and a table plate 66 of the turntable 46. The rods 64 and 65 pass through the table plate such that the lower crossbar 63 extends underneath the table plate 66 at a certain distance.

The rods 64, 65 in this embodiment form the elastically expansible or tensionable components of the molding station 20. For this purpose a dog 67 for a tensioning unit is arranged on the lower side of the crossbar 63. Additional structural and functional details of this embodiment are shown in FIGS. 5 to 9.

The lower part 23 of the lower mold 43 is rigidly mounted to the table plate 66 on top of a heating plate 68. The upper part 22 is connected to an intermediate mold plate 69 to which the lower part 23 of the upper mold 42 is also fastened. Its upper part 22 is mounted on the upper crossbar 62 via a heating plate 70. The intermediate plate 69 serves as a heating plate for the adjacent parts of the molds, and also implements the opening separations and closing of the molds 42 and 43.

The cylindrical rods 64, 65 are fastened to the upper crossbar 62 by anchor nuts 71 and to the lower crossbar 63 by threaded heads 72, and are surrounded by separate pipes 73, 74 mounted on the crossbars 62, 63. The pipes 73, 74 are made of a material having a low modulus of elasticity, for example gray cast iron or aluminum alloy. The dimensions and the arrangement are such that the ends of the pipes 73, 74 abut and they are under an axial load when the rods 64, 65 are in their released or unlocked condition (FIG. 4, right). Accordingly, the pipes 73, 74 are relieved when the rods 64, 65 are stretched and then released with the wedge 79 and molds in place (FIG. 4, left).

A collar 75 is mounted as a stop above the table plate 66 on one of the pipes 73, 74. When opening the molds 42, 43 by lifting the entire system of the rods and crossbars, the intermediate plate 69 which projects laterally out from the molds 42, 43 is engaged by the collar 75 and lifted off with continued upward movement to the final position shown in FIG. 4, right whereat the mold halves are fully accessible.

The opening upward and closing downward movements (FIG. 4) are automatically effected during the rotation of the turntable 46 by a roller 76 attached to the lower crossbar 63 or to the dog 67 running in a cam track 77.

The collar 75 also serves as a limit stop for the downward movement and tensioning of the rods 64, 65 by resting on the table plate 66. The pipes 73, 74 are slideably guided in friction bearings 78 of the table plate.

The closed position is also locked in this embodiment by a wedge 79. With the rods 64, 65 expanded the wedge is placed between the lower crossbar 63 and the lower side of the table plate 66 (see particularly FIG. 6). For this purpose the wedge 79 is held in a radially movable manner at its upper end 80 by a dovetailed guide 81 attached to the lower side of the table plate.

In its supporting position (solid lines in FIG. 6) the wedge 79 rests with a lower ramp surface 82 on a rising counter surface 83 of the lower crossbar 63. A comparatively slight expansion of the rods 64, 65 (approximately 1 to 1.2 mm) creates a sufficient gap to move the wedge into a stable supporting position in which the rod clamping tension is maintained. Any measurement tolerances or elongations of the system are automatically compensated for by radially adjusting the wedge 79 in or out on the counter surface 83. The actuation of the wedge 79 is effected by a hydraulic cylinder whose piston rod 84 only is shown in FIG. 7 for reasons of simplification.

The wedge 79 fulfills an additional function when, as an alternative to the arrangement shown in FIG. 4, a separate lifting cylinder not shown in the drawings is used to raise the crossbars 62, 63 and the rods 64, 65. This cylinder only acts at a given station in a momentary fashion to lift the unit into the position of FIG. 4, right. In this lifted position the system is locked in a detachable manner by the wedge 79. For such purpose the wedge is provided with a recess 85 (FIG. 7) on the side towards the crossbar 63 into which the raised crossbar or a projection 86 thereof enters in a supporting manner. The wedge 79 has an additional recess 87 below the upper one to accommodate the dog 67 to lock and unlock the crossbar 63 in the upper position. The wedge 79 is correspondingly moved forward and backward by the actuating cylinder piston rod 84.

Figure 6:
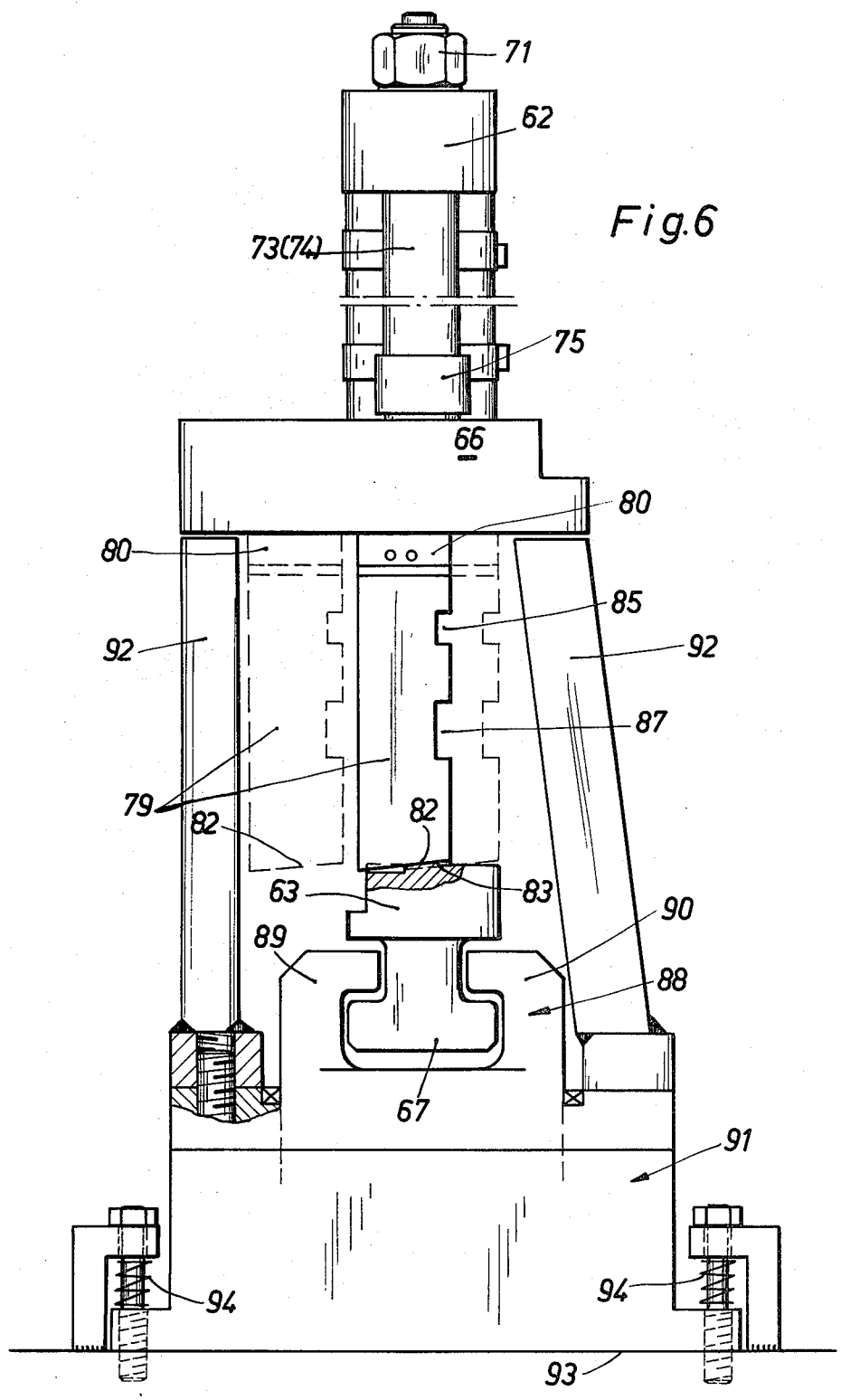
FIG. 6 shows a side view of a mold in a tensioning station.
Figure 7:
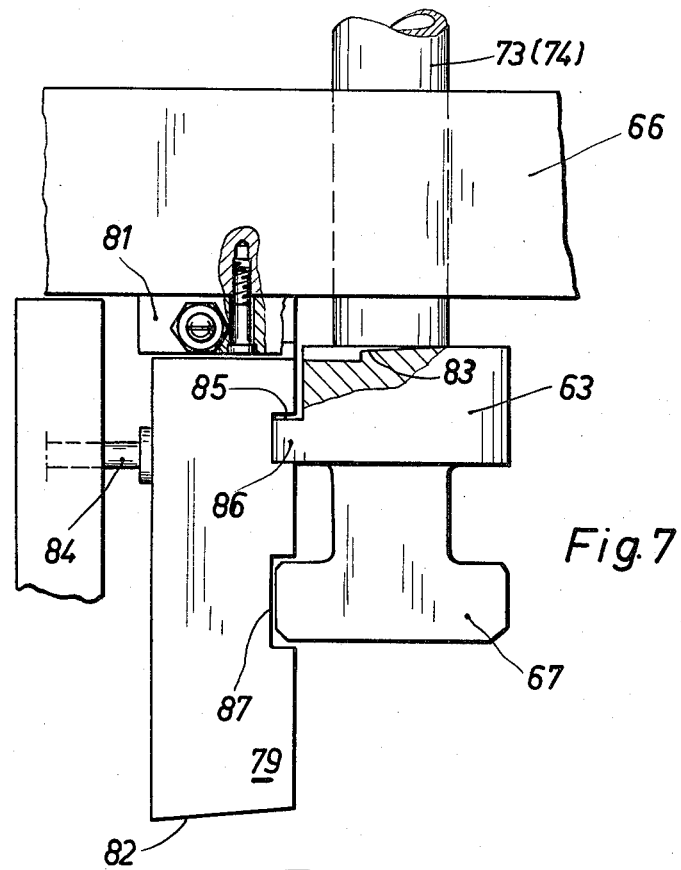
FIG. 7 shows a detail of the mold open according to FIG. 6.
Figure 8:
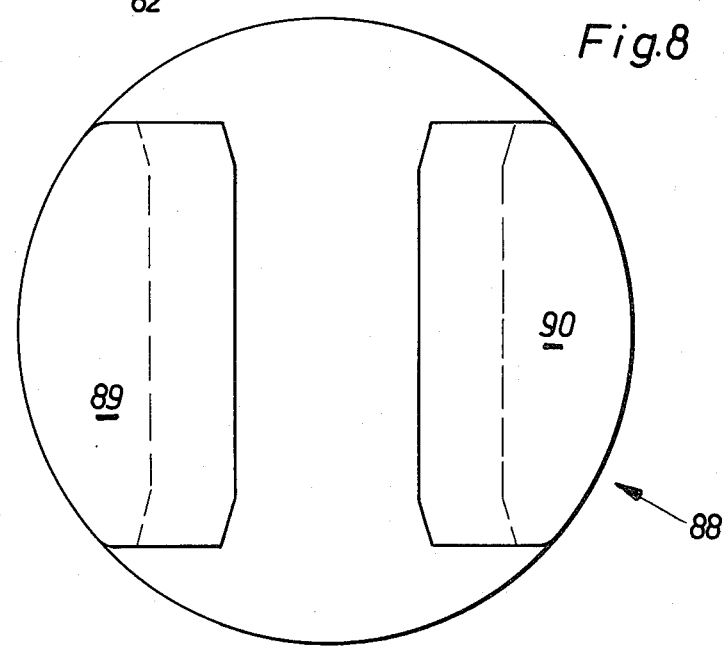
FIG. 8 shows a horizontal projection of a detail of a tensioning station.

The opening and closing of the molds is preferably effected at tensioning stations by stationary units, as shown in FIGS. 6 to 8. The dog 67 on the lower side of the crossbar 63 is conveyed into a counter dog 88 (FIG. 8) of the tensioning unit by the rotation of the turntable 46. Jaws 89, 90 of the counter dog are oriented in the direction of movement of the dog 67 to implement the coupling and decoupling functions. The counter dog 88 is attached to a movable piston of a hydraulic cylinder 91 which tensions the rods 64, 65 in a downward direction by only a slight movement. The reaction forces of the cylinder 91 are transferred to the lower side of the table plate 66 through support arms 92 attached to the cylinder such that a slight spacing remains when the cylinder is released or inactivated to enable the free rotation of the table plate.

The cylinder 91 is supported in a "floating" manner; it rests on a stable base 93 in its initial position. When actuated the cylinder is lifted off the base 93 against the pressure of springs 94, and the support arms 92 bear against the turntable plate 66. The springs 94 ensure that the cylinder 91 and the support arms 92 always return to their initial position.

Figure 9:
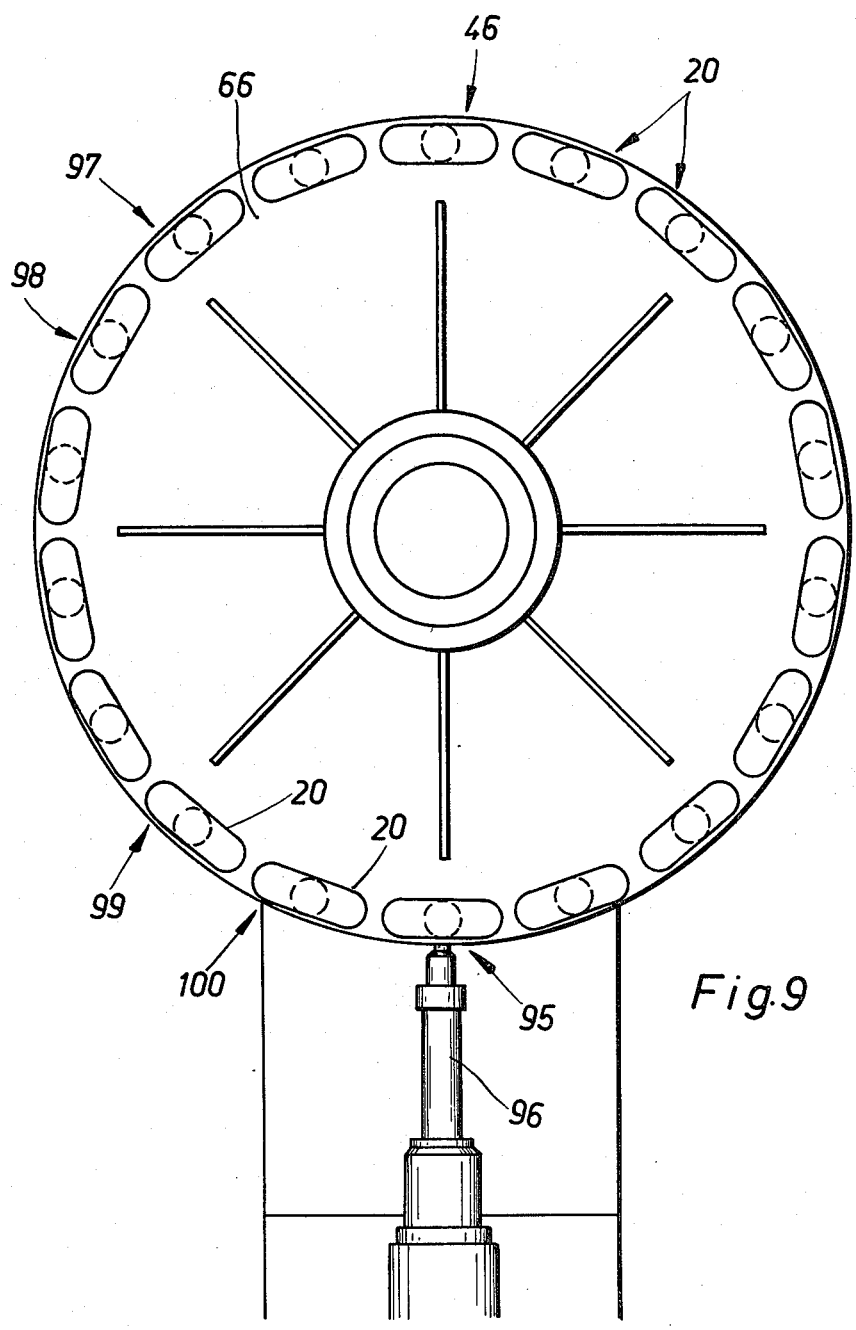
FIG. 9 shows a turntable system in a simplified horizontal projection.

FIG. 9 shows an application of the invention to a turntable 46 which has a number of molding stations 20. The mold material is charged into the respective mold cavities at an injection station 95 by an injection unit 96. After progressing through a number of stations for hardening the molded articles, the cured molds are released by the removal of the wedge 79 at an unlocking station 97 having a tensioning unit as in FIGS. 6–8. The opening of the molds is effected in the manner described above at a subsequent opening station 98. This is followed by several stations at which the necessary preparation work is performed on the molds. They are reclosed at station 99 and then reclamped at tensioning and wedging station 100.

What is claimed is:

1. An apparatus for producing molded articles of plastic or rubber, comprising:
    (a) a mold assembly including separable upper and lower mating parts defining therebetween a mold cavity,
    (b) clamping means for holding the mold parts in an assembled state,
    (c) elastically yieldable tensioning means embodied in and integral with the clamping means, and
    (d) means for expanding the tensioning means to enable the separation of the mold parts, whereby the tensioning means exerts a closing force on the mold parts upon the release or relaxation of the expanding means.

2. An apparatus according to claim 1, wherein the tensioning means comprises means connecting upper and lower support elements of the clamping means between which the mold assembly is held.

3. An apparatus according to claim 1, wherein the tensioning means comprises upper and lower parallel bendable arms between which the mold assembly is held, and which are rigidly connected together at their ends remote from the mold assembly.

4. An apparatus according to claims 1, 2 or 3, further comprising locking wedge means (31, 32, 79) insertable between the clamping means and the mold assembly for maintaining the expansion of the tensioning means when the expanding is relaxed.

5. An apparatus according to claim 4, wherein the expanding means comprises a pressure medium cylinder (91) temporarily engageable with the clamping means.

6. An apparatus according to claim 5, comprising a plurality of molding stations spacedly mounted around the periphery of a turntable (46) indexable through two spaced stationary stations each having a tensioning unit.

7. An apparatus according to claim 6, wherein each molding station includes two stacked mold assemblies mounted on a radially movable carrier (51).

8. An apparatus according to claim 2, wherein the connecting means comprises elongated tension rods (64, 65) disposed within incompressible pipe sections (73, 74).

9. An apparatus according to claim 8, wherein a plurality of molding stations are spacedly mounted around the periphery of a turntable (46), and a radially movable wedge (79) is assigned to each molding station and is slideably suspended in a guide (81) on the lower side of a table plate (66).

10. An apparatus according to claim 9, wherein a tensioning pressure medium cylinder (91) is engageable with a lower support element through a dog (67) and counter dog (88).

11. An apparatus according to claim 10, wherein the dog engagement is automatically effected by moving a molding station into a stationary tensioning station (100) or an unlocking station (97).

12. An apparatus according to claim 11, wherein the tensioning cylinder (91) is mounted underneath the table plate (66) and is spaced therefrom by support arms (92).

13. An apparatus according to claim 12, wherein the released tension rods (64, 65) are movable upwardly together with support element crossbars (62, 63) and the mold assemblies (42, 43) to open the mold cavities.

14. An apparatus according to claim 13, wherein the lifted lower crossbar (63) is locked in the upper position by engagement with the wedge (79).

15. An apparatus according to claim 14, wherein two mold assemblies (42, 43) are stacked on top of each other in a common molding station, and the lower mold (43) is opened by lifting an intermediate mold plate (69) to which the upper part (22) of the lower mold (43) and the lower part (23) of the upper mold (42) are connected.

16. An apparatus according to claim 15, wherein the molds (42, 43) are lifted with the tension rods (64, 65) during the rotation of the turntable (46) by a roller (76) on the lower crossbar (63) running in a stationary cam track (77) surrounding the turntable.

* * * * *